United States Patent

[11] 3,595,109

| [72] | Inventors | Robert K. Burroughs<br>Batavia;<br>Timothy A. Wakefield, Cincinnati, both of, Ohio |
|---|---|---|
| [21] | Appl. No. | 1,176 |
| [22] | Filed | Jan. 7, 1970<br>Division of Ser. No. 631,991, Apr. 19, 1967, Pat. No. 3,513,734. |
| [45] | Patented | July 27, 1971 |
| [73] | Assignee | The R. K. LeBlond Machine Tool Co.<br>Cincinnati, Ohio |

[54] TOOL TURRET
6 Claims, 10 Drawing Figs.

[52] U.S. Cl..................................................... 82/34,
82/37, 77/55 C, 279/1
[51] Int. Cl...................................................... B23b 3/36
[50] Field of Search............................................ 82/34;
279/1 E, 1 ME; 77/25, 55.3; 29/568

[56] References Cited
UNITED STATES PATENTS

| 926,761 | 7/1909 | Oliver............................ | 279/1 |
| 3,054,333 | 9/1962 | Brainard et al. ............. | 82/36.1 X |

Primary Examiner—Leonidas Vlachos
Attorney—Wood, Herron and Evans

ABSTRACT: An indexable tool turret for use in a machine tool having an automatic tool changer. The turret has two tool stations, both of which have a motor operated clamp for securing a tool in the station with a locating surface of the tool clamped against a locating surface of the turret. Each station has a plurality of air jets directed at the tool when it is inserted into the station so that dirt and debris are blown clear of the tool and particularly its locating surfaces automatically as the tool is inserted into the station. Indexing of the turret is effected by lifting the tool turret clear of a gear coupling and rotating the turret to a new index position after which it is lowered to reengage the gear coupling. A hydraulic motor raises and lowers the turret and functions as a relatively friction free hydraulic thrust bearing to support the turret in the raised position while it is indexed.

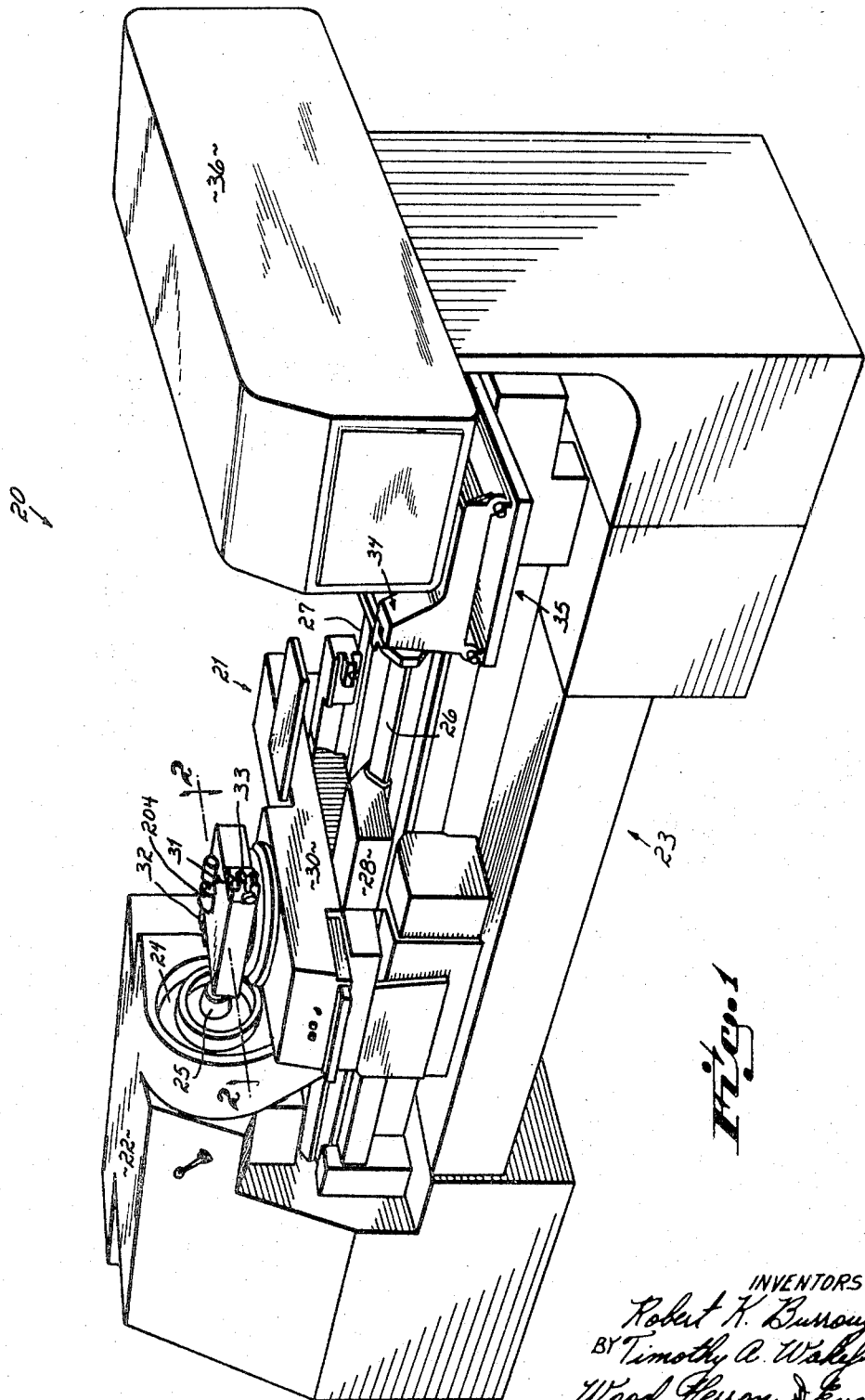

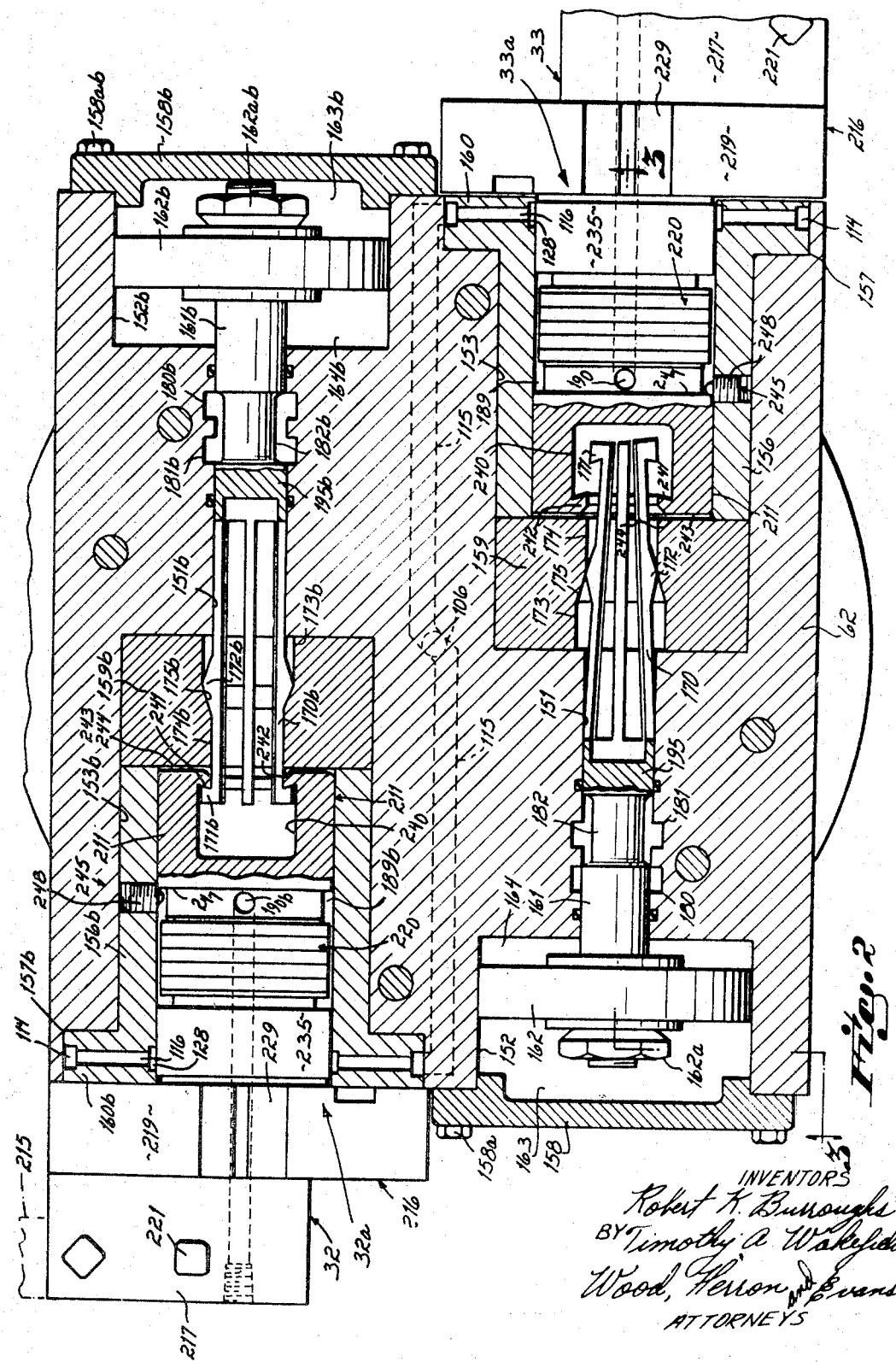

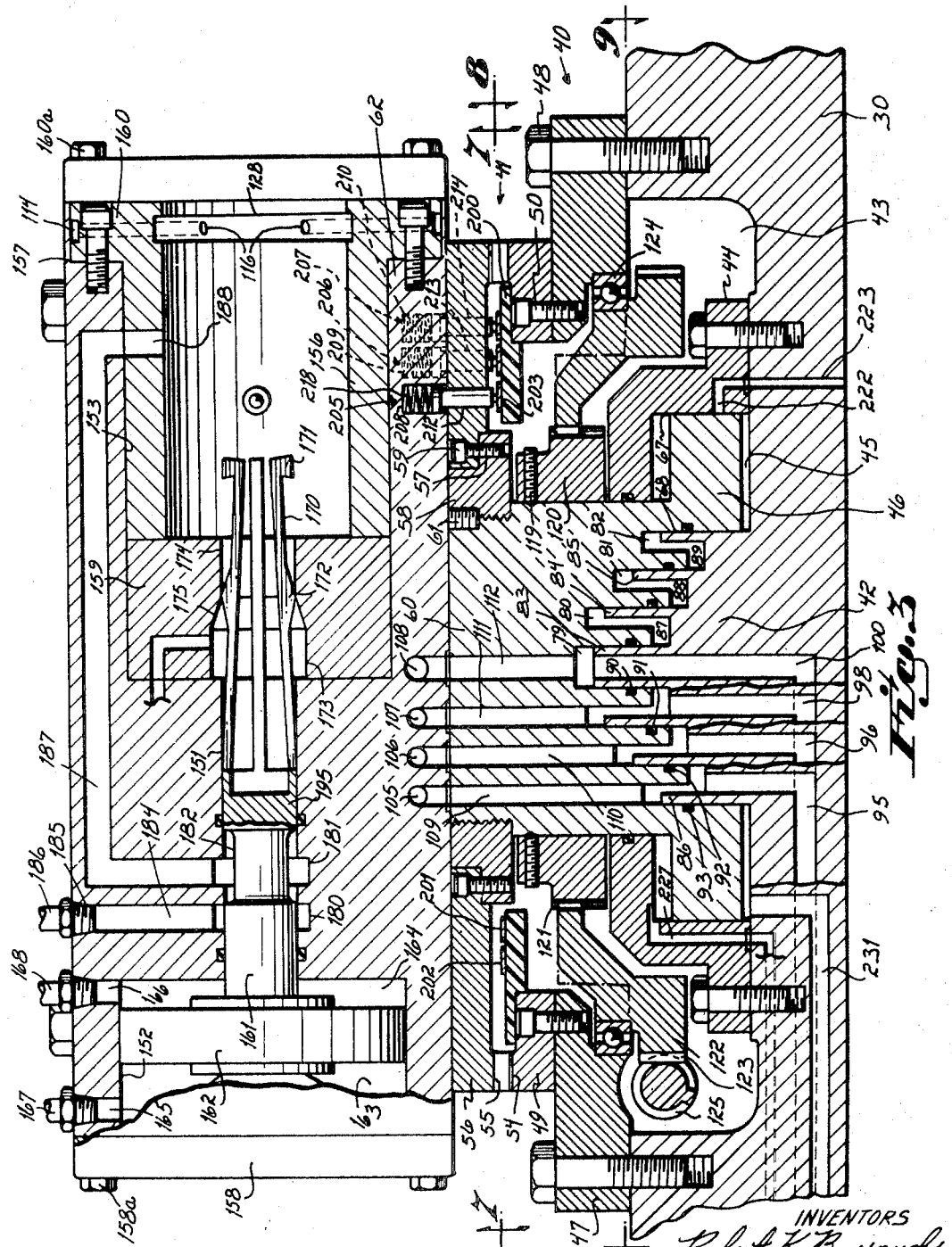

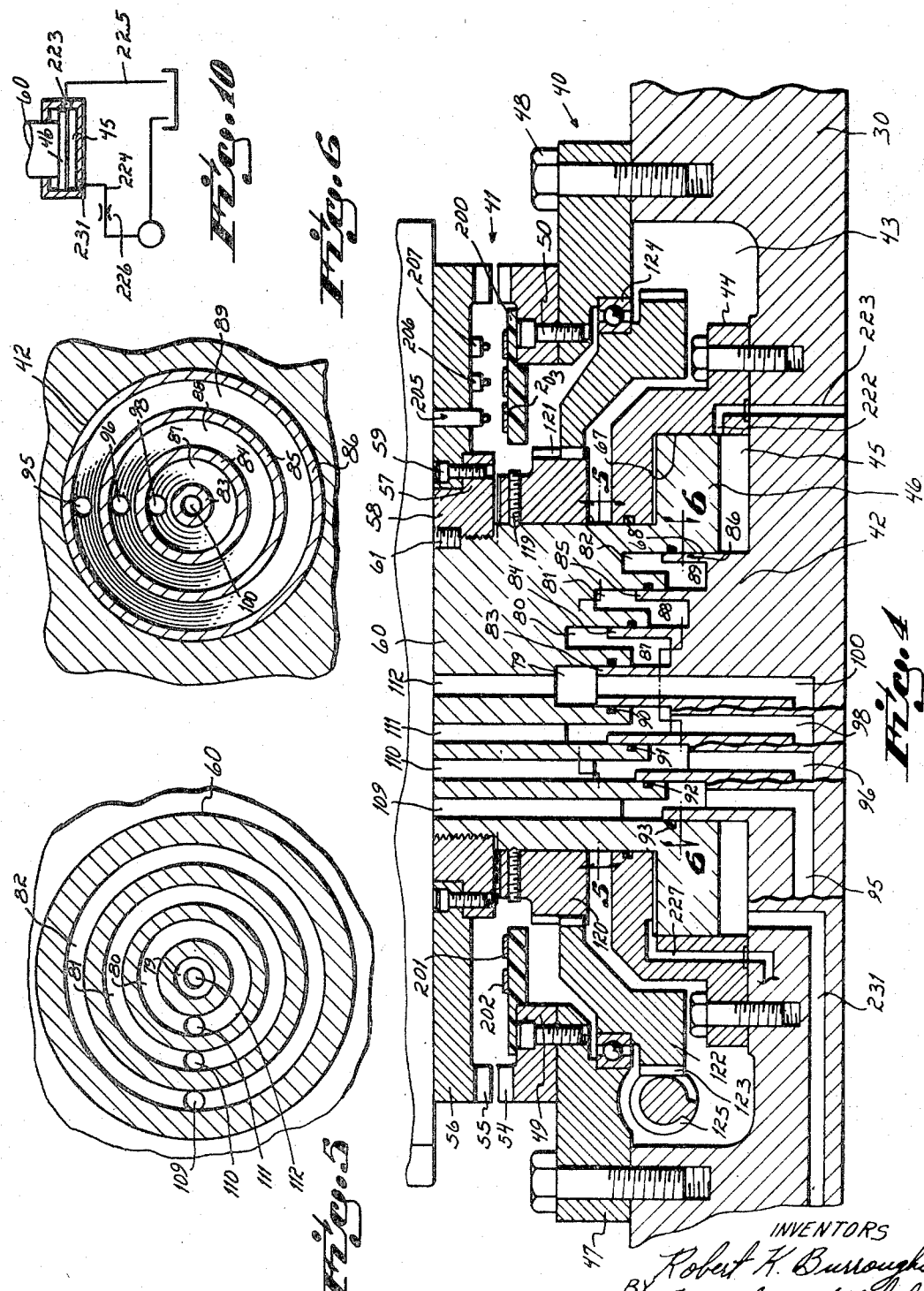

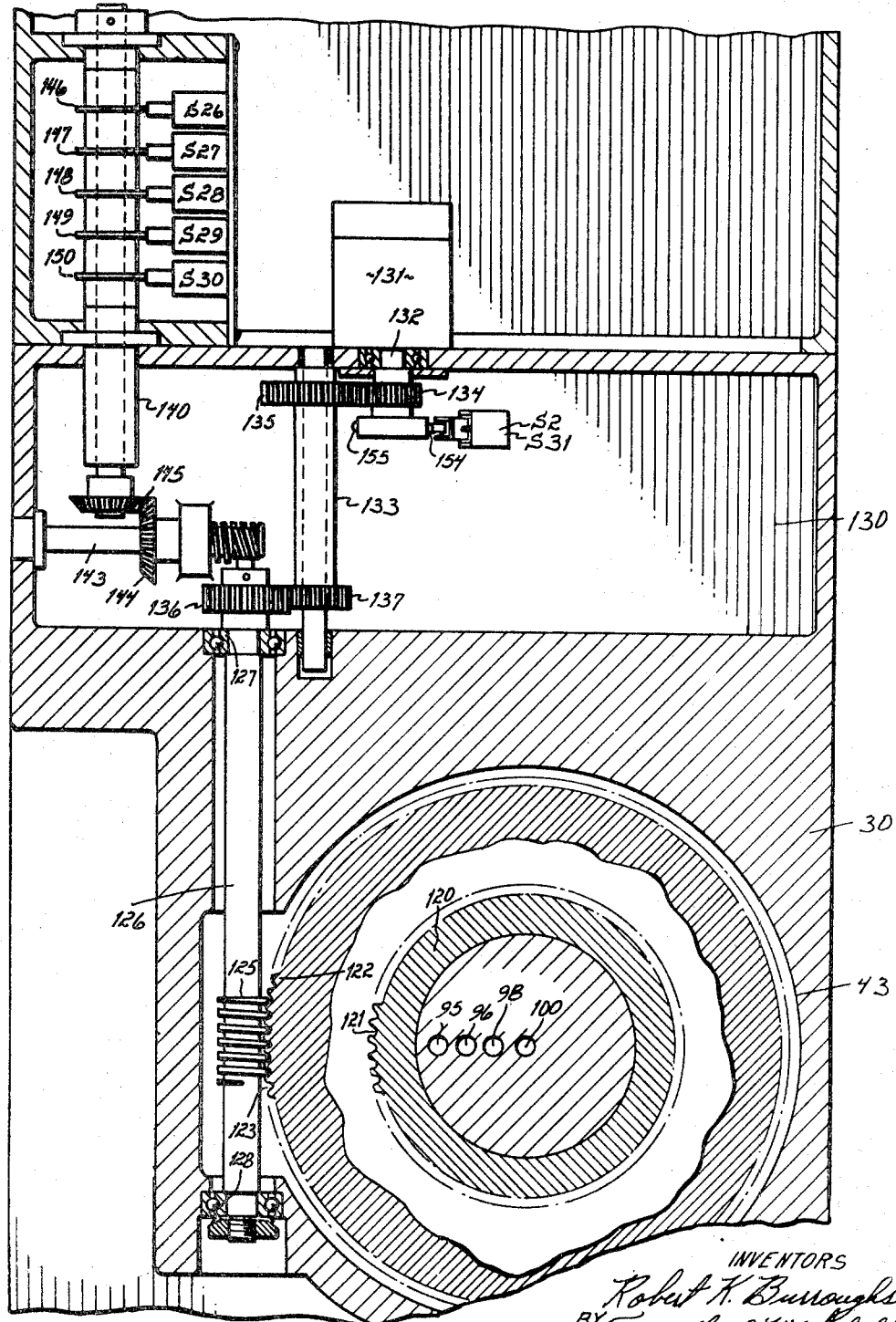

TOOL TURRET

CROSS-REFERENCE TO RELATED APPLICATION

This application is a Division of application Ser. No. 631,991, filed Apr. 19, 1967 and now Pat. No. 3,513,734.

The turret of this invention is completely illustrated and described as a portion of an automatic tool changer for a lathe in an application which was filed concurrently with the parent application of which this application is a division and which is assigned to the assignee of this application. That application contains a complete disclosure of this invention in one preferred environment although it should be understood that some aspects of this invention are equally applicable to other machine tools or indexable type machines irrespective of whether they incorporate an automatic tool changer.

BACKGROUND OF THE INVENTION

The turret of this invention is particularly suited for use as a part of a machine tool which has an automatic tool changer for inserting tools into or removing tools from the tool support stations of the turret. In this type of application, the tools must be securely clamped in the turret. If not securely clamped, the tools compromise the rigidity of the machine with the result that the tools may "chatter" or move during a machining operation and thus detrimentally affect the quality of the work produced in the machine. Therefore, a primary objective of this invention has been to provide a turret having an improved tool clamping mechanism for securely and rigidly clamping a tool in the turret in an accurate predetermined position.

SUMMARY

The turret which accomplishes these objectives is mounted for vertical and rotational movement. In the preferred embodiment, the turret has two tool stations, each one of which has its own independently operable tool clamp for locking and unlocking tools in the station. Each clamp comprises a hydraulic motor actuated plunger, the outer end of which terminates in four fingers which extend into a tool socket of the tool holder. When the plunger is moved inwardly, the four fingers are cammed together so as to enable a recess in the shank of a tool to be slipped over hooks on the ends of the fingers. Subsequently, when the plunger is withdrawn or moved in a direction to withdraw the hooks from the socket, the fingers spread or move apart laterally so as to engage the hooks with a radial surface of the tool shank. Upon continued movement of the plunger, the shank of the tool is pulled into the socket until a locating surface on the shank abuts a locating surface of the turret. When these locating surfaces are abutting, the tool is very accurately positioned relative to the locating surface of the turret.

One of the primary difficulties in accurately positioning a tool in the tool holder of a machine tool of the type which incorporates an automatic tool changer occurs as a result of dirt, dust and debris accumulating on the surface of the tool while it is stored in a magazine. We have found that the detrimental effects of this accumulation may be reduced or avoided by air jets, located around the entrance of the socket of the tool holder, and directed at the tool as it is inserted into the socket. These jets or air streams automatically blow the dirt, dust and debris away from the tool as it is inserted into the holder and thus substantially increase the accuracy with which the tool may be positioned within the socket. Additionally, the air stream being emitted from the tool receiving socket of the tool block as the tool is inserted into the socket serves the additional function of acting as a hydrostatic or self-centering bearing to guide or center the tool in the socket, thereby avoiding metal to metal contact if the tool is slightly misaligned with the socket.

These and other objects and advantages of this invention will become more readily apparent from the drawings in which:

FIG. 1 is a perspective view of a lathe provided with the inventive tool turret of this application.

FIG. 2 is a cross sectional view of the tool turret taken along line 2–2 of FIG. 1.

FIG. 3 is a cross sectional view through the tool turret taken along line 3–3 of FIG. 2.

FIG. 4 is a cross sectional view of the base portion of the tool turret of FIG. 3 illustrating the turret in a raised or unclamped position relative to the turret base.

FIG. 5 is a cross sectional view through the tool turret port block taken along line 5–5 of FIG. 4.

FIG. 6 is a cross-sectional view through the turret base port plate taken along line 6–6 of FIG. 4.

FIG. 9 is a cross-sectional view of the tool turret base, particularly illustrating the turret rotational drive system and taken along line 9–9 of FIG. 3.

FIG. 10 is a diagrammatic illustration of a hydraulic circuit for controlling raising and lowering of the turret.

Figure 7:
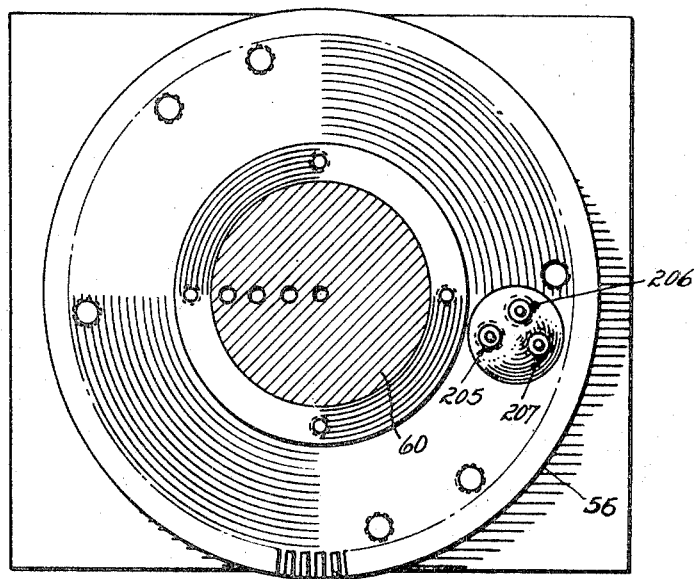
FIG. 7 is a cross-sectional view of the bottom of the tool turret taken along line 7–7 of FIG. 3.

Referring to FIG. 1, the turret of this application is illustrated as applied to a lathe 20, which comprises a tool carriage 21, and headstock 22, mounted upon a bed 23. The headstock 22 is a conventional geared transmission type of headstock operable to drive a spindle (not shown) on the end of which is mounted a chuck 24 for rotatably supporting a workpiece 25. Ways 26, 27 on the top of the bed 23, slidably support a Z axis slide 28 of the carriage 21 for movement longitudinally of the bed along the Z axis of the machine. An X-axis cross-slide 30 is slidably supported upon ways (not shown) of the Z-axis slide 28 for movement laterally of the bed 23 along the X-axis of the machine. A turret 31 is mounted upon the carriage 21 and supports a pair of tools 32, 33 which may be alternately moved into engagement with the rotating workpiece to effect either turning, facing, boring, chasing, tapping, drilling, etc. of the workpiece.

An automatic tool changer 34 is also mounted upon the lathe 20 and comprises a tool transfer carriage 35 for transporting tools between the turret 31 and a tool storage magazine 36. A complete description of the tool changer 34 may be found in an application which is being filed concurrently herewith and which is assigned to the assignee of this application. Since this tool changer forms no part of the invention of this application, it is not described herein in detail. Similarly, the lathe 20, except for the tool turret 31, forms no part of the invention of this application and therefore is not described in detail herein.

Figure 8:
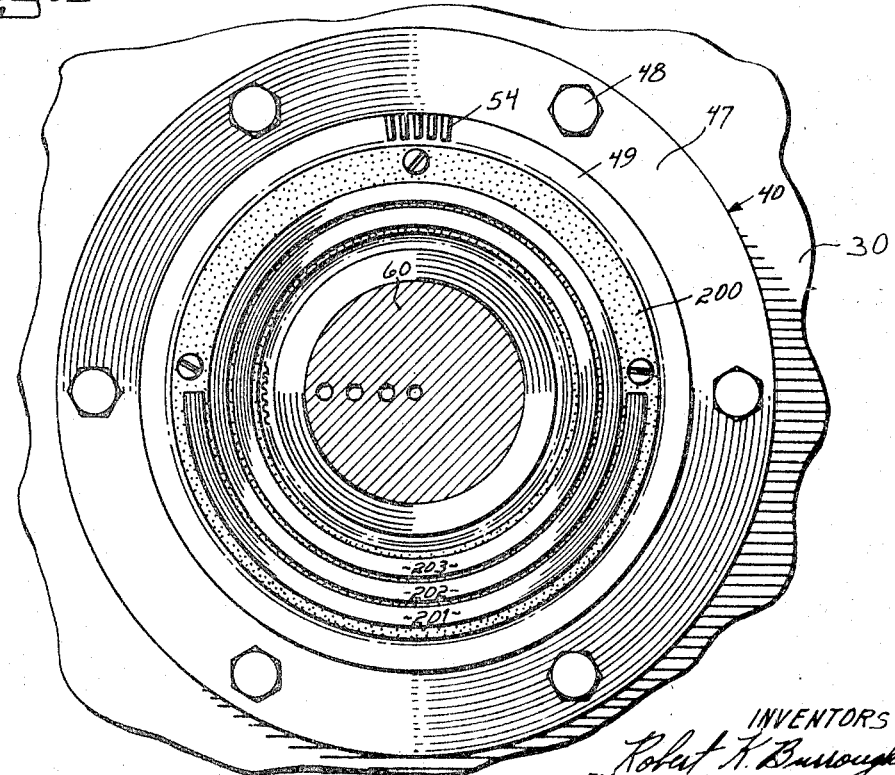
FIG. 8 is a cross-sectional view of the top of the tool turret base taken along line 8–8 of FIG. 3.

The turret 31 is shown in detail in FIGS. 2—8. It comprises a rotatable tool block 62 and a stationary turret base 40. The base 40 is fixedly secured to the turret cross-slide 30 and in the illustrated embodiment, supports the tool block 62 in any of twelve different angulated positions which are 30° apart. Indexing of the tool block 62 requires that the turret 31 be lifted vertically relative to the base 40 to disengage a curvic coupling 41 between index positions. This coupling 41 serves the dual function of locking the turret against rotational movement and accurately locating the tool block 62 in a predetermined angulated condition in each index position.

The turret base 40 fits over a cylindrical post or protrusion 42 of the cross-slide 30 which is generally centered within a recess 43 of the slide 30 (see FIG. 9). An annular ring 44 is bolted to the cross-slide 30 in the bottom of the recess 43 and is spaced outwardly from the cylindrical post so as to define a fluid chamber 45 within which a depending piston 46 fixed to the tool turret 31 is axially movable. A second annular ring 47 circumscribes the top of the recess 43 and is secured to the turret slide 30 by bolts 48. This ring 47 supports the bottom gear 49 of the curvic coupling 41 which is secured to the top surface of the ring 47 by bolts 50. The top of the gear 49 has teeth 54 which extend upwardly and mesh with depending gear teeth 55 of a gear 56 of the coupling 41. The upper gear 56 of the coupling 41 is secured to an annular flange 57 of a ring 58 by bolts 59. The ring 58 in turn is threaded onto a shaft 60 and locked thereto by a set screw 61 positioned in a tapped hole that resides half in the shaft 60 and half in the ring 58. With the gear 56 secured to the shaft 60, it is vertically and rotatably movable with the tool block 62.

The shaft 60 depends from the tool block 62 of the turret 31 and functions as a piston rod during raising and lowering of the turret 31. Piston 46 forms a flange on shaft 60 and is slideable within the chamber 45 defined between the interior surface 67 of the ring 44 and the exterior surface 68 of the cylindrical post 42 of the cross-slide 30.

The bottom of the shaft 60 has a central vertical bore 79 surrounded by three annular channels or grooves 80, 81 and 82. A central post 83 of the protrusion 42 extends upwardly into the bore 79 and three annular rings 84, 85 and 86 of the protrusion extend into the three annular grooves 80, 81 and 82, respectively. The width of each of the annular rings 84, 85 and 86 is less than the width of the grooves 80, 81 and 82 so that there are open annular channels or flow paths 87, 88 and 89 in all of the grooves 80, 81 and 82. An O-ring 90 is mounted in an annular groove on the interior of the bore 79 and is operable to form a seal between the post 83 and the aperture 79. Similarly, three O-rings 91, 92 and 93 are mounted in annular recesses of the channels 80, 81 and 82 and are engageable with the annular rings 84, 85 and 86, respectively, so as to form seals between the annular channels.

A conduit 95 in the cross-slide 30 connects the annular groove 89 with a hydraulic exhaust tank. Another conduit 96 in the cross-slide 30 connects the groove 88 with a source of air pressure and another conduit 98 connects the channel 87 with a source of coolant under pressure. A fourth conduit 100 in the slide connects a central aperture 101 in the post 83 with a source of fluid pressure. Each of the three annular channels 87, 88, 89 and the central aperture 101 is connected to channels 105, 106, 107 and 108 in the tool block 62 by channels 109, 110, 11 and 112 in the shaft 60.

Both of the turret conduits 105 and 108 are interconnected through a control valve to fluid lines or conduits 167, 168 which supply fluid flow to two hydraulic motors in the turret. These motors control the clamping and unclamping of tools in the tool stations 32a, 33a of the turret as is explained more fully hereinafter.

The conduit 107 of the turret is connected to a tool coolant supply line 186 which supplies coolant to the cutter bits of the tools 32, 33, as is explained more fully hereinafter.

The turret conduit 106 is interconnected to the tool holders of the turret through a pair of conduits 115 in the tool block 62. These conduits 115 are each connected to an annular channel 114 which is in turn connected to four radial conduits 116. These latter conduits 116 are equidistantly spaced about the interior of the tool receiving sockets of the tool block and have end orifices which open into an annular recess 128 of the sockets. Air pressure is supplied to the conduit 96 and subsequently to the orifices of conduits 116 according to a programmed scheduling such that the air is emitted as an air stream against the peripheral surface of a tool adapter shank as the tool is inserted into the tool holder sleeve 156 of the turret. In this way, all dirt and debris which might otherwise interfere with proper location of the tool in the turret is blown clear of the shank while the tool is being inserted into the tool receiving socket of the turret. Additionally, the air stream being emitted from the tool receiving socket of the tool block as the tool is inserted into the socket serves the additional function of acting as a hydrostatic or self-centering bearing to guide or center the tool in the socket, thereby avoiding metal to metal contact if the tool is slightly misaligned with the socket.

As may be seen most clearly in FIGS. 2 and 3, the air orifices 116 are all aimed radially of the tool adapter shank, or, otherwise expressed, at the longitudinal axis of the tool adapter shank. It has been found that this direction of the air stream is critical to proper cleansing of the tool shank. If directed tangentially of the shank, the air streams tend to create a vortex and pull or such dirt and debris into the tool socket of the turret rather than blowing debris away from it.

Rotation is imparted to the tool block 62 through the tool post 60 and an attached spur gear 120 which is mounted over the periphery of the post and is secured thereto by a series of set screws 119. The peripheral teeth 121 of this spur gear 120 are coupled to an internally splined gear 122, the periphery of which has worm gear teeth 123 machined thereon. This worm gear is supported for rotation by a ball bearing race 124 which is in turn supported from the annular ring 47. A helical worm 125 of a worm shaft 126 is drivingly engaged with the worm gear 122. As may be seen most clearly in FIGS. 3 and 9, the worm wheel shaft 126 is supported for rotation in the turret cross-slide 30 by a pair of ball bearings 127 and 128. A recess 130 in the top surface of the cross-slide accommodates the drive mechanism to the worm shaft 126.

This drive mechanism comprises a rotary fluid motor 131, the output shaft 132 of which is drivingly connected to an intermediate shaft 133 through a pair of spur gears 134, 135. The shaft 133 is in turn drivingly connected to a spur gear 136 on the shaft 126 through another spur gear 137 such that rotation of the motor 131 effects rotation of the worm shaft 126 and thus of the worm wheel 122. Rotation of the worm wheel then causes rotation of the tool holder through the splined connection between the wheel 122 and the gear 120 attached to the post 60.

Also drivingly connected to the worm shaft 126 is a cam shaft 140 which is rotatably supported in the turret cross-slide 30. The cam shaft 140 is driven from a helical gear 141 attached to one end of the worm shaft 126 through an idler shaft 143 and a pair of bevel gears 144 and 145. Thus rotation of the worm shaft and of the turret results in synchronized rotation of the cam shaft 140. Five cams 146, 147, 148, 149 and 150 on the cam shaft 140 control actuation of five switches S26 through S30 which operate to control the rough positioning of the tool block 62 at one of twelve different index positions. Two additional cam controlled switches S2 and S31 control final accurate positioning of the tool block. These last two switches S2, S31 are controlled by lobes 154 and 155 of a cam which is mounted on the end of the output shaft 132 of the motor 131. Since this cycling and the control circuits associated with this control function form no part of the invention of this application, they have not been described in detail in this application. A complete disclosure of these circuits may be found in the copending application which is being filed concurrently herewith and which is directed to the complete tool changer mechanism of which this turret is one component.

As may be seen most clearly in FIGS. 2 and 3, the tool block 62 contains two tool stations, each one of which has a clamping mechanism operable to secure a tool therein. Since the stations are identical, only one station 33a will be described in detail although it should be appreciated that another identical tool station and tool clamp is located on the opposite side of the turret. For purposes of identification, the components of the tool station 32a have been given identical numerals to the corresponding parts of the station 33a except that the numerals designating the parts of the turret at the station 32a are followed by the suffix b.

Referring to FIG. 2, it will be seen that the tool block 62 has a longitudinal aperture 151, 151b extending therethrough at each of the tool stations 32a, 33a. This aperture is counterbored to provide an enlarged diameter section 152 and 153 at each end, and the counterbored section 153 at one end is enlarged still further by a counterbored recess 157. A cap 158 is secured to the tool block 62 by bolts 158a so as to enclose counterbored recess 152 of the aperture 151. The opposite counterbored end 153 of the aperture has a cam ring 159 mounted therein which is held in place by the sleeve 156. A flange 160 of the sleeve 156 is seated within the largest diameter section 157 of the aperture 151 and is secured to the tool block by bolts 160a (FIG. 3).

A tool clamping rod 161 is slidably mounted within the smallest diameter section of the aperture 151 and is attached by a bolt 162a to a piston 162 which is slidable within the counterbored section 152 of the aperture 151. The counterbored recess 152 of the aperture defines the chamber of a hydraulic cylinder, the opposite end chambers 163 and 164 of which are connected to ports 165 and 166 in the tool block 62. Both of these ports 165, 166 are connected by the conduits 167 and 168, respectively, to a valve 204 which controls the pressure of the fluid in the chambers 163, 164 of the cylinder and thus the movement of the piston 162 within the cylinder.

At the end opposite the piston 162, four laterally movable fingers 170 are machined in the end of the rod 161. Each finger 170 has a radially extending hook 171 on its outer end and a generally triangular shaped lobe 172 intermediate the ends. The lobes 172 are movable between a larger internal diameter portion 173 of the cam ring 159 and a smaller internal diameter portion 174. A sloping internal surface 175 of the cam ring 159 interconnects these two different diameter portions 173 and 174 of the cam ring and acts as a cam surface upon the lobes 172 of the fingers. When the piston 162 is moved outwardly, the cam surface 175 permits the lobes 172 to move apart and the fingers to spread to the position illustrated in the upper one, namely station 32a, of the two tool holder stations shown in FIG. 2. When the piston is moved inwardly, the cam surface 175 forces the fingers 170 together into the position shown at station 33a in FIG. 2.

A pair of longitudinally spaced, annular grooves 180, 181 extend radially from the bore 151 in the tool block. These grooves are cooperable with an annular channel 182 in the surface of the rod 161 so as to form a valve, operable to control the flow of coolant to a tool held in the tool holders. As may be seen most clearly in FIG. 3, one of these annular grooves or channels 180 is connected by a conduit 184 through the tool block to a port 185. Coolant is supplied to this port and subsequently to the valve through the hose 186 connected to the port. The other channel or groove 181 is connected by a conduit 187 in the tool block 62 to a radial conduit 188 in the tool holder sleeve 156. The conduit 188 opens into an annular groove 189 in the periphery of a tool shank so as to supply coolant through the channels 187, 188 to the annular groove 189 and from the groove 189 through the channel 190 of the tool shank to the tool. As may be seen in the upper half of FIG. 2, the annular groove or channel 182 b of the rod 160b interconnects the two annular grooves 180, 181 so as to permit the flow of fluid therebetween when the rod 161b is moved outwardly to its tool clamping position. When the rod 161 is moved inwardly to unclamp a tool, the rod 161 completely blocks the annular channel 180 and precludes the flow of fluid between the two channels 180, 181.

Referring now to FIGS. 3, 4, 7 and 8, it will be seen that a control ring 200 made from plastic or other electrically insulative material is attached to the stationary gear 49 of the curvic coupling 41. Two spaced annular contacts 202, 203 of electrically conductive material are mounted on the top surface of the ring 200 as well as a semicircular contact 201 of electrically conductive material. The semicircular contact 201 and the two annular contacts 202, 203 are spaced from each other so as to preclude electrical interconnection between the three contacts.

Three vertically slideable pins or brushes 205, 206 and 207 are mounted within three recesses 208, 209, 210 of the tool block and extend through apertures 212, 213, and 214 of the upper gear 56 of the curvic coupling 41. These brushes 205, 206 and 207 are all biased downwardly into engagement with the contacts 201, 202 and 203, respectively, by springs 218 located within each of the recesses 208, 209, 210, respectively. Each of the brushes is connected to an electrical lead (not shown) and similarly each of the contacts is connected to another electrical lead (not shown) so that the brushes and contacts cooperate to complete a circuit from the stationary base into the vertically movable and rotatable tool holder portion of the turret. These circuits control the cycling of a solenoid operated valve 204 mounted on top of the tool block 62 (FIG. 1) which in turn controls the actuation of the tool clamping motors. Since this hydraulic circuit and the associated electrical control circuit form no part of the invention of this application, they have not been illustrated in detail although a complete description may be found in the tool changer application which is being filed concurrently herewith.

As shown in FIG. 2, each tool 32, 33 comprises a tool adapter or holder 216 and a cutter bit 215. Throughout this application, the term "tool" is used generically to designate the tool adapter 216 having a cutter bit 215 mounted therein. The cutter bits may be in the nature of facing tools, drills, boring tools, turning tools or any other shaped or configurated machining or forming tool.

Each tool adapter 216 comprises a rearwardly extending cutter clamping block 217, a central flange section 219, a rearwardly extending code carrying section 220, and an adapter clamping section 211. The cutter clamping block is generally rectangular and has a longitudinal recess (not shown) on one side adapted to receive the cutter 215. To clamp a cutter 215 in the recess, a pair of locking screws 221 are threaded through the top of the block into engagement with the top of the cutter 215.

The top of the flange section 219 of the tool adapter is provided with a longitudinally extending V-shaped notch 229. Another similar V-shaped notch (not shown) extends longitudinally along the bottom of the flange 219. These notches 229 serve as clamping surfaces for the gripper of the tool changer transfer slide 35.

A circular locating ring 235 extends rearwardly from the flange 219 and supports the adapter in the sleeve 156. The adapter clamping section 211 of the adapter extends rearwardly from the coding section 220 and is of the same outside diameter as the locating ring 235. This diameter is slightly smaller than the internal diameter of the sleeve 156 so that these surfaces accurately locate the adapter in the sleeve 156 of the turret. An undercut recess 240 extends forwardly from the rear end of the adapter 216. At its rearwardmost end, this recess is provided with a forwardly sloping surface 241 of an inwardly extending flange 242. The hooked end portions 171 of the tool clamping fingers cooperate with this sloping surface 241 to engage the adapter and pull it rearwardly until the rearward radial surface of flange 219 engages the forwardmost radial surface of the sleeve 160. In this way, the axial position of the adapter within the tool holder is positively fixed or located.

To hold the tool adapter in the turret sleeve 156 until it is clamped and after it is released by the gripper of the tool transfer slide, a spring biased detent pin 245 is mounted in the sleeve 156 in a position to engage a radial face 247 of the adapter. This detent pin 245 is held in place in the sleeve by a set screw 248.

In operation, fluid is supplied to the chamber 45 beneath the turret lifting piston 46 through a channel 231 in the cross-slide 30, causing the piston and turret 31 to rise until a port 222 in the cylinder ring 44 is opened. As may be seen most clearly in FIG. 10 (which is a diagrammatic illustration of the turret hydraulic lifting control system), the piston 46 continues to rise and lift the turret 31 until the flow of fluid through the channel 231 into the chamber 45 is balanced by the outflow through the port 222 to an exhaust conduit 223 of the cross-slide 30. The channel 231 is connected to a conduit 224 which contains a needle valve 226. The exhaust conduit 223 is connected to an exhaust conduit 225. The valve 226 is adjusted and balanced so that the flow into the chamber 45 balances the flow out of the chamber through the port 222 when the piston 46 is raised sufficiently to clear the gear teeth 54 of the curvic gear 49 with the gear teeth 55 of the gear 56. As shown in FIG. 3, a port 227 is provided in the top of the chamber.

The advantage of this hydraulic circuit and control system is that it utilizes the hydraulic motor, including the piston 46 and cylinder 44, as a thrust bearing to support variable weight loads at a predetermined height or elevation without the use of auxiliary equipment such as stop switches, etc. As a consequence, there is no metal to metal contact between the top surface of the piston 46 and the end surface of the cylinder 44 when the tool turret 31 is subsequently rotated. Thus friction is minimized and a very small hydraulic motor 131 may be used to effect rotation of the tool turret 31 after the curvic coupling 41 is disconnected.

When the tool holder has been raised to its full elevation so as to disengage the gear teeth of the curvic coupling 41, and after a time delay initiated by a pressure switch in the line 224, the contacts of the pressure switch are closed so as to initiate rotation of the hydraulic motor 131 through an appropriate control circuit. Actuation of this motor 131 effects rotation of the tool holder through the geared coupling between the motor and worm wheel 122. When the worm wheel is rotated, it causes the gear 120 and attached turret post 60 to be rotated through the splined gear connection 121. The motor continues to rotate and index the turret until a lobe 154 or 155 on the cam actuates the switch S31. Actuation of this switch S31 stops motor rotation and thus rotation of the turret. When the turret rotation has been stopped, the fluid chamber 45 is disconnected from the pressure source and is connected to exhaust, and chamber 67 is connected to pressure via conduit 227 by a solenoid actuated valve so that the piston 46 and attached tool holder are lowered to again couple the gears of the curvic coupling 41, and rigidly clamp the two halves 54, 55 of the curvic coupling.

After the turret tool holder 62 has been lowered to recouple the gears of the curvic coupling, or while the turret is being indexed, the piston 162 of the tool clamping motor at the station 33a is actuated so as to unclamp the tool 33. Thereafter, the unclamped tool may be removed from the station 33a either manually or automatically by the tool transfer slide 35, and a new tool inserted into the station 33a. During insertion of the new tool into the station 33a, air pressure is supplied to the orifices of conduits 116 so that all dirt and debris is blown clear from the shank as it is inserted into the tool holder 62. Preferably, the air supply to the orifices of conduits 116 remains on until the tool is fully inserted or at least partially inserted into the tool receiving socket of the tool holder. When left on while the tool is being seated into the socket, this air supply serves the additional function of acting as a "hydrostatic" bearing to guide the tool into the socket. Since the tool receiving socket is closed, all air must escape between the tool and the outer edge of the socket so that the escaping air acts as a pressure stream to guide to tool into the socket without any metal to metal contact during insertion. This is particularly critical if the tool change is to occur while another tool in the tool holder is machining a workpiece so that a bump or jar of the tool holder would scar or mar the finish of the workpiece.

After the new tool is fully inserted into the station 33a, the amping motor may be actuated to move the piston 162 away om the tool so that the clamping fingers move outwardly to gage the tool and pull it rearwardly to the position illus- ated in the top tool holder station 32a of FIG. 2. The tool holder 62 may then again be indexed to present the new tool to the station 32a preparatory to a new machining cycle.

While only a single preferred embodiment of a turret has t n illustrated and described herein, those skilled in the art to which this invention pertains will readily appreciate that t' invention is susceptible to numerous changes and modifications without departing from the spirit of our invention. Therefore, we do not intend to be limited except by the scope of the appended claims.

Having described our invention, we claim:

1. For use in combination with a machine tool having an automatic tool changer, a tool holder having a socket for the reception of interchangeable tools, clamping means mounted upon said tool holder and operable to clamp tools in said socket of said holder with a locating surface of the clamped tool abutting against a locating surface of said tool holder, the improvement which comprises:
   a plurality of air jet orifices located around the periphery of said socket, said orifices being directed at a tool as it is moved into said socket, and
   means for supplying air at a pressure above that of the atmosphere to said orifices when a tool is inserted into said socket so as to blow dust and debris away from the surface of said tool.

2. The tool holder of claim 1 wherein said orifices are directed inwardly toward the centerline of said socket.

3. The tool holder of claim 1 wherein said socket is circular in cross section and said orifices are directed radially toward the axis of said socket.

4. For use in combination with a machine tool having an automatic tool changer,
   a tool holder having an enclosed socket for reception of interchangeable tools,
   clamping means mounted upon said tool holder and operable to clamp tools in said socket of said holder,
   air orifice means opening into said socket, and
   means for supplying air at a pressure above that of the atmosphere to said orifice while a tool is being inserted into said socket so as to form a pneumatic self-centering bearing between said tool and the surface of said socket during said tool insertion including said air orifice means opening into said socket and means for supplying air at a pressure above that of the atmosphere to said orifice during tool insertion into said socket.

5. The tool holder of 4 wherein a plurality of air orifices open into said socket and are directed inwardly toward the centerline of said socket.

6. The tool holder of claim 5 wherein said socket is circular in cross section and said orifices are directed radially toward the axis of said socket.